(12) United States Patent (10) Patent No.: US 7,505,076 B2
Ogawa (45) Date of Patent: Mar. 17, 2009

(54) DIGITAL CAMERA HAVING RED-EYE REDUCTION BRACKET PHOTOGRAPHING MODE

(75) Inventor: Kimiaki Ogawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 682 days.

(21) Appl. No.: 10/892,088

(22) Filed: Jul. 16, 2004

(65) Prior Publication Data

US 2005/0013602 A1    Jan. 20, 2005

(30) Foreign Application Priority Data

Jul. 18, 2003    (JP)    ............... 2003-276824

(51) Int. Cl.
*H04N 5/222* (2006.01)
*H04N 5/235* (2006.01)

(52) U.S. Cl. .................. 348/370; 348/371; 348/363

(58) Field of Classification Search ........... 396/155, 396/157, 158, 88, 177, 161; 348/362, 367, 348/371, 370, 241, 231.99, 231.91, 363
See application file for complete search history.

(56) References Cited

U.S. PATENT DOCUMENTS

| | | | |
|---|---|---|---|
| 5,300,970 | A | 4/1994 | Fukuhara et al. |
| 5,532,740 | A | 7/1996 | Wakui |
| 6,700,619 | B1 * | 3/2004 | Hamamura ............... 348/370 |
| 6,707,995 | B1 * | 3/2004 | Ichikawa et al. ........... 396/100 |
| 2004/0033071 | A1 * | 2/2004 | Kubo ...................... 396/158 |

FOREIGN PATENT DOCUMENTS

| | | |
|---|---|---|
| JP | 7-12980 | 3/1995 |
| JP | 8-9715 | 3/1996 |
| JP | 2569444 | 10/1996 |
| JP | 2837891 | 10/1998 |
| JP | 11-212150 | 8/1999 |
| JP | 20 00-13680 | 1/2000 |
| JP | 2000-125185 | 4/2000 |

OTHER PUBLICATIONS

English Language Abstract of JP 2000-13680.
English Language Abstract of JP 11-212150.
English Language Abstract of JP 2000-125185.

* cited by examiner

*Primary Examiner*—Tuan V Ho
*Assistant Examiner*—Selam T Gebriel
(74) *Attorney, Agent, or Firm*—Greenblum & Bernstein, P.L.C.

(57) ABSTRACT

In a digital camera having a red-eye reduction bracket photographing mode, a plurality of bracket photographing operations are carried out at a predetermined second interval, in which a strobe unit pre-emits strobe flash emission and, after the lapse of a predetermined first time from the pre-emission, emits main strobe flash emission to pickup an image by an image pickup unit. The image data obtained by each bracket photographing operation is written in a cache memory. Upon completion of the writing of the image data, the latter is read from the cache memory and is indicated in an image displaying LCD unit. A user can observe the indicated image data while switching the same by a selection switch. Consequently, only the image data selected by the user using an OK switch can be recorded in an image recording medium.

11 Claims, 7 Drawing Sheets

DIGITAL CAMERA HAVING RED-EYE REDUCTION BRACKET PHOTOGRAPHING MODE

BACKGROUND OF THE INVENTION

1. Field of the Invention

The present invention relates to a red-eye reduction bracket photographing mode in which a photograph is taken while carrying out a plurality of light emissions by a strobe unit after the strobe unit pre-emits light.

2. Description of the Related Art

There is known a camera having a red-eye reduction mode in which a strobe unit pre-emits light immediately before a photographing operation with the help of strobe light emitted from the strobe unit, in order to reduce or prevent a red-eye phenomenon using the strobe unit. The time from the pre-emission until a human subject closes his or her eyes considerably varies between individuals and/or between differing environmental conditions. Consequently, a photographer cannot always obtain intended effects to reduce the red-eye phenomenon.

To prevent occurrence of the red-eye phenomenon, the distance between a light emitter of the strobe unit and a photographing lens should be made as large as possible. However, in compact cameras in particular, the distance between the light emitter and the photographing lens is limited.

In a known camera using a silver halide film disclosed in Japanese Patent No. 2,837,891, continuous photographing operations are carried out after the pre-emission of the strobe light to reduce the red-eye phenomenon. However, in this known camera using a silver halide film, as continuous photographing operations are merely performed after the pre-emission, the number of wasted frames of the film is great.

There is also known a digital camera in which the occurrence of red-eye is removed by software in a reproducing display, disclosed in Japanese Unexamined Patent Publication No. 2000-13680. However, the color of the pupil and the degree of the red-eye effect depends on the individual, and hence, it is difficult for a photographer to eliminate the red-eye phenomenon as satisfactorily.

Under these circumstances, there has been need to provide a camera in which the red-eye phenomenon is prevented or is at least reduced.

SUMMARY OF THE INVENTION

The present invention provides a digital camera having a red-eye reduction bracket photographing mode in which the red-eye phenomenon, which would otherwise occur upon photographing using strobe flashlight, can be effectively reduced upon a photographing operation.

To achieve the object mentioned above, according to an aspect of the present invention, there is provided a digital camera having a red-eye reduction bracket photographing mode, including an image pickup device, a strobe unit which can pre-emit a flash emission of light, an image pickup control device having a bracket photographing mode in which a plurality of image pickup operations to pickup an image by emitting main strobe light from the strobe unit are repeated after the lapse of a predetermined-first time counted from a pre-emission of the strobe unit, a temporary storage device in which image data obtained by the plurality of image pickup operations of the image pickup device is temporarily written, an image display device for reading and displaying the image data written in the temporary storage device, an image selection device by which a user can select the image data displayed in the image display device, and a recording device for writing the image data selected by the image selection device in a recording medium.

According to the above-described structure, a plurality of main emissions of the strobe unit are carried out to pickup an image after the lapse of the first predetermined time from the pre-emission and the picked-up image data is indicated in the display device which enables a user to visually confirm the image so that only the image data which the user really needs can be written in the recording medium. Consequently, regardless of the difference between individuals or between differing environmental conditions, image data in which the red-eye phenomenon is effectively reduced can be obtained. Furthermore, it is possible for the user to store only the image data which the user wants to record.

It is desirable for the image selection device to be capable of selecting at least one of the image data written in the temporary storage device or not selecting any of the image data written in the temporary storage device.

It is desirable for a data erasing device to be provided for removing the image data not selected by the image selection device from the temporary storage device.

It is desirable for a bracket photographing number setting device to be provided, by which a user can set the number of the bracket photographing operations in which the strobe unit is activated to emit main strobe light to thereby pickup an image.

It is desirable for the strobe unit to include a charging voltage detection device for detecting a charging voltage, and for the image pickup control device to terminate the bracket photographing even before the number of the bracket photographing operations reaches a set value in the case where the strobe charging voltage detected by the detection device prior to each strobe emission is too small to emit the strobe light from the strobe unit.

It is desirable for the image pickup control device cause the display device to indicate alarm information in the case where the bracket photographing ends before the number of the bracket photographing operations reaches the set value.

The digital camera can include an interval setting device by which a user can set a first period of time from the pre-emission to a first main emission of the strobe light.

The digital camera can include a bracket photographing interval setting device by which a user can set intervals of the bracket photographing operations to pickup an image by the main emission of the strobe unit.

The bracket photographing interval setting device can independently set intervals of the main emission of the strobe unit to pickup an image.

The digital camera can include a memory for storing the intervals of the bracket photographing operations set by the bracket photographing interval setting device. The intervals of the bracket photographing operations include a minimum value which is represented by the longest of a time in which the writing of the exposure time and the image data output from the image pickup device into the temporary storage device is completed and a time in which a subsequent main emission of the strobe unit can be effected.

The digital camera can include a pre-emission time setting device by which a user can set a pre-emission time.

The digital camera can include an object photometering device and an object distance measuring device, wherein the image pickup control device sets one of the pre-emission time and the first time, based on brightness information obtained by the photometering device and object distance information obtained by the object distance measuring device.

The digital camera can include a charging voltage detection device for detecting a charging voltage of the strobe unit and an image processing device for adjusting a color temperature in connection with the image data, based on the charging voltage when the strobe unit emits the strobe light, detected by the charging voltage detection device.

The present disclosure relates to subject matter contained in Japanese Patent Application No. 2003-276824 (filed on Jul. 18, 2003) which is expressly incorporated herein by reference in its entirety.

BRIEF DESCRIPTION OF THE DRAWINGS

Embodiments of the present invention will be discussed below with reference to the accompanying drawings, in which:

FIG. 8 shows an example of an indication of a variable setting mode in a red-eye reduction bracket photographing operation in a digital camera shown in FIG. 1.

DESCRIPTION OF THE PREFERRED EMBODIMENTS

Figure 1:
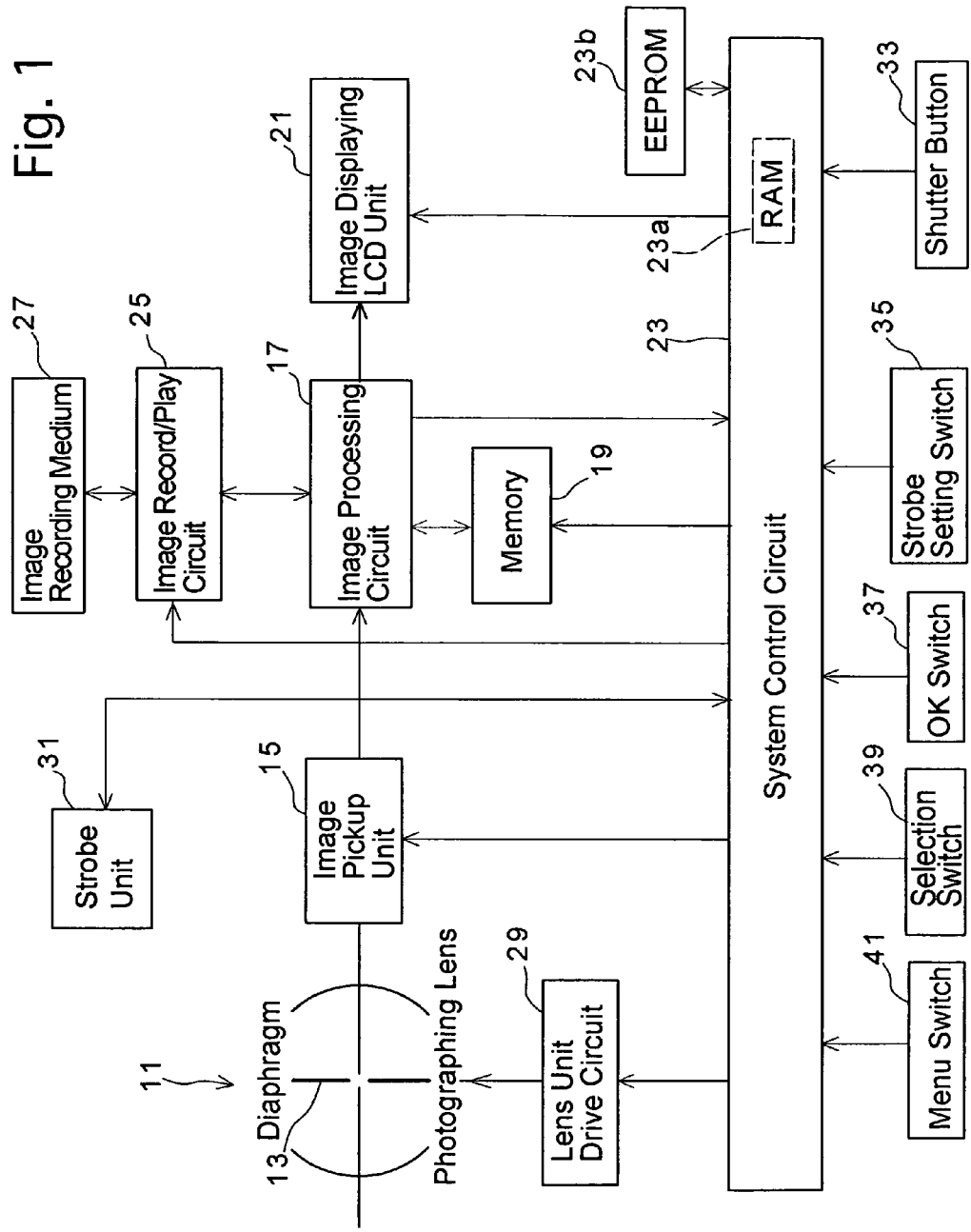
FIG. 1 is a block diagram of main components of a digital camera according to the present invention.

In FIG. 1, which shows a block diagram of main components of a digital camera to which an embodiment of the present invention is applied, the digital camera includes a photographing lens 11 having a diaphragm mechanism 13, so that an object image formed by the photographing lens 11 is picked up and converted to an electrical signal by an image pickup unit 15. The image data output from the image pickup unit 15 which has converted the picked up image to an electrical signal is subject to predetermined processes such as white balance correction by an image processing circuit 17 and is written in a cache memory (temporary storage device) 19, and is displayed as a visible image by an image displaying LCD unit 21. These operations are controlled by a system control circuit 23.

The photographing lens 11 includes a focusing lens group (not shown) and the diaphragm mechanism 13. The focusing lens group and the diaphragm mechanism 13 are driven by a lens unit drive circuit 29.

The system control circuit 23 detects a focus state by a contrast method, using the image data in a predetermined area to thereby detect a focal position of the focusing lens group. Consequently, the focusing lens group is moved to the focal position through the lens unit drive circuit 29. Also, the system control circuit 23 detects the object brightness using the image data in a predetermined area to thereby drive the diaphragm mechanism 13 through the lens unit drive circuit 29.

The image pickup unit 15 includes a CCD image pickup device and a drive circuit therefore, etc., and performs the image pickup operation in response to a control signal supplied from the system control circuit 23.

The digital camera also includes a strobe unit (strobe flash) 31. The strobe unit 31 includes a light emitter such as a xenon lamp, a main condenser and a charging circuit, for emitting strobe light, and a charging voltage detection circuit which detects a charging voltage of the main condenser.

The system control circuit 23 causes the image pickup unit 15 to execute a so-called movie operation when the power supply source is turned ON at a photographing mode, so that the image picked up by the image pickup unit 15 is displayed in the image displaying LCD unit 21.

In a normal photographing mode, if a shutter button 33 is half-depressed during the movie operation, an object distance measuring operation is carried out wherein the focusing lens group is moved to search for an in-focus position via lens unit drive circuit 29, based on the image data supplied from the image processing circuit 17, whereby the focusing lens group is moved to the in-focus position through the lens unit drive circuit 29 and an AE locking operation in which the brightness is measured to calculate and lock the exposure time and the diaphragm value. While the shutter button 33 is half-depressed, the image data is displayed in the image displaying LCD unit 21 in a movie mode.

If the shutter button 33 is fully depressed, the image pickup operation is carried out at the set exposure time and the set diaphragm value. The image data input to the image processing circuit 17 is stored in the cache memory 19. The image data written in the cache memory 19 is read by the record/play circuit 25, is converted into image data having a predetermined format, is written in a detachable image recording medium 27, and is removed from the cache memory 19. These operations are controlled by the system control circuit 23. The system control circuit 23 serves as an erasing device for erasing the image data stored in the cache memory 19 (temporary storage device).

The digital camera of the invention is provided with a red-eye reduction bracket photographing mode in which the strobe unit 31 is controlled so that a plurality of main emissions are executed at predetermined intervals after pre-emission of the strobe unit 31 for reducing red-eye phenomenon. The red-eye reduction bracket photographing mode is set by operating a strobe mode setting switch 35. The strobe modes which can be set by the strobe mode setting switch 35 include a conventional red-eye reduction mode, an automatic emission mode, a forced emission mode, and an emission prohibiting mode, in addition to the red-eye reduction bracket photographing mode.

In the red-eye reduction bracket photographing mode, if the shutter button 33 is depressed by full step, the pre-emission occurs first. After the lapse of a first predetermined time, an image pickup operation is carried out by the first main emission of the strobe unit 31. Thereafter, at each lapse of a second predetermined time, an image pickup operation is carried out by a second main emission of the strobe unit 31 and an image pickup operation is carried out by a third main emission of the strobe unit 31. The respective image data obtained by the three main strobe emissions are written in the cache memory 19.

When the image pickup operations by the three main emissions are completed, the image data of the first image pickup operation is displayed in the image displaying LCD unit 21. Each time the selection switch 39 is depressed, the image data of the first to third image pickup operations are repeatedly displayed in the image displaying LCD unit 21 in a looped sequence. When an OK switch 37 is turned ON, the image data displayed at that time in the image displaying LCD unit 21 is written in the image recording medium 27, and all the image data written in the cache memory 19 is erased. Consequently, control is returned to a standby mode.

A menu switch 41 is used to display the exposure mode, etc., so as to change/select the mode.

Figure 2:
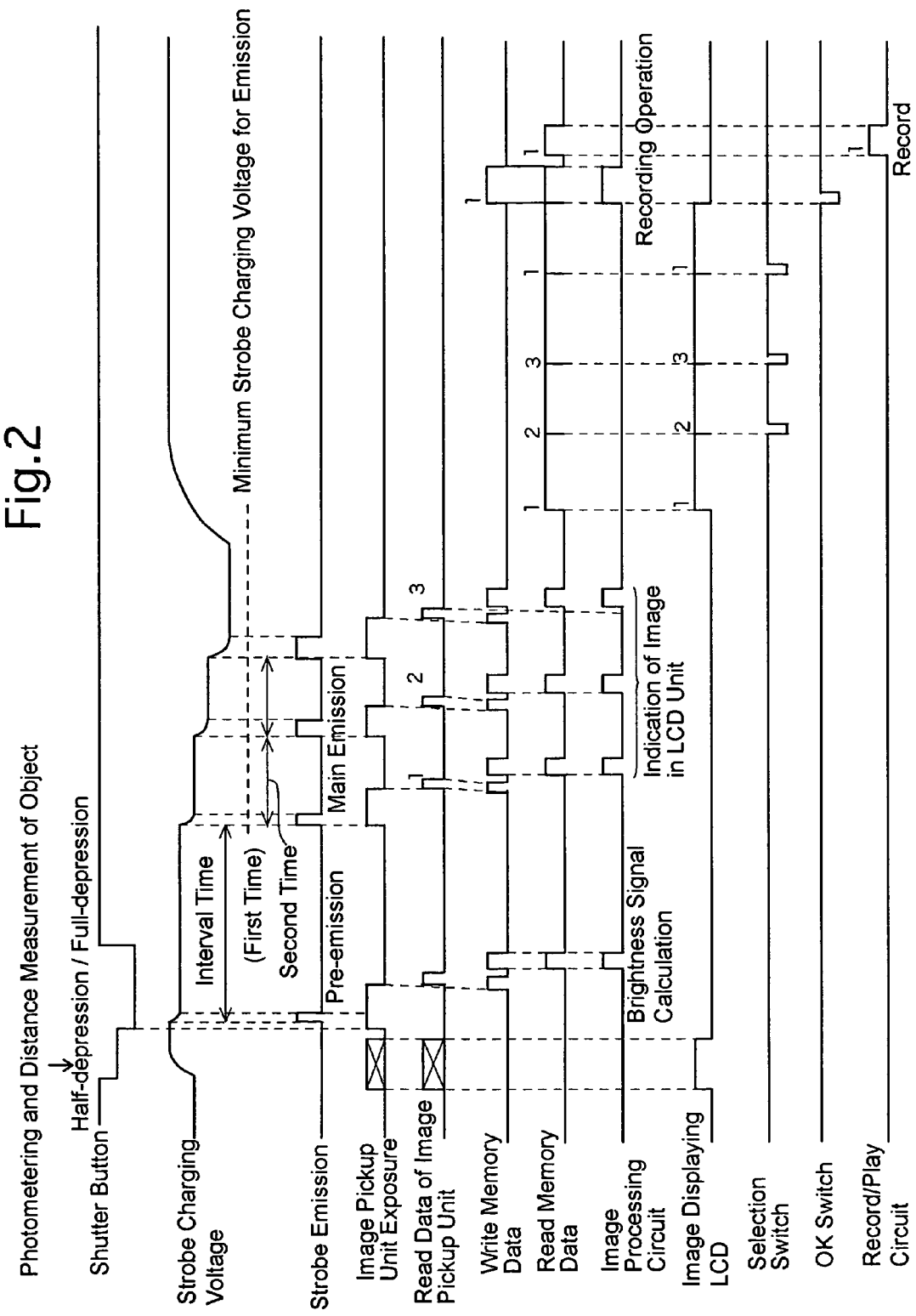
FIG. 2 is a timing chart of a red-eye reduction bracket photographing operation in a digital camera shown in FIG. 1.
Figure 3:
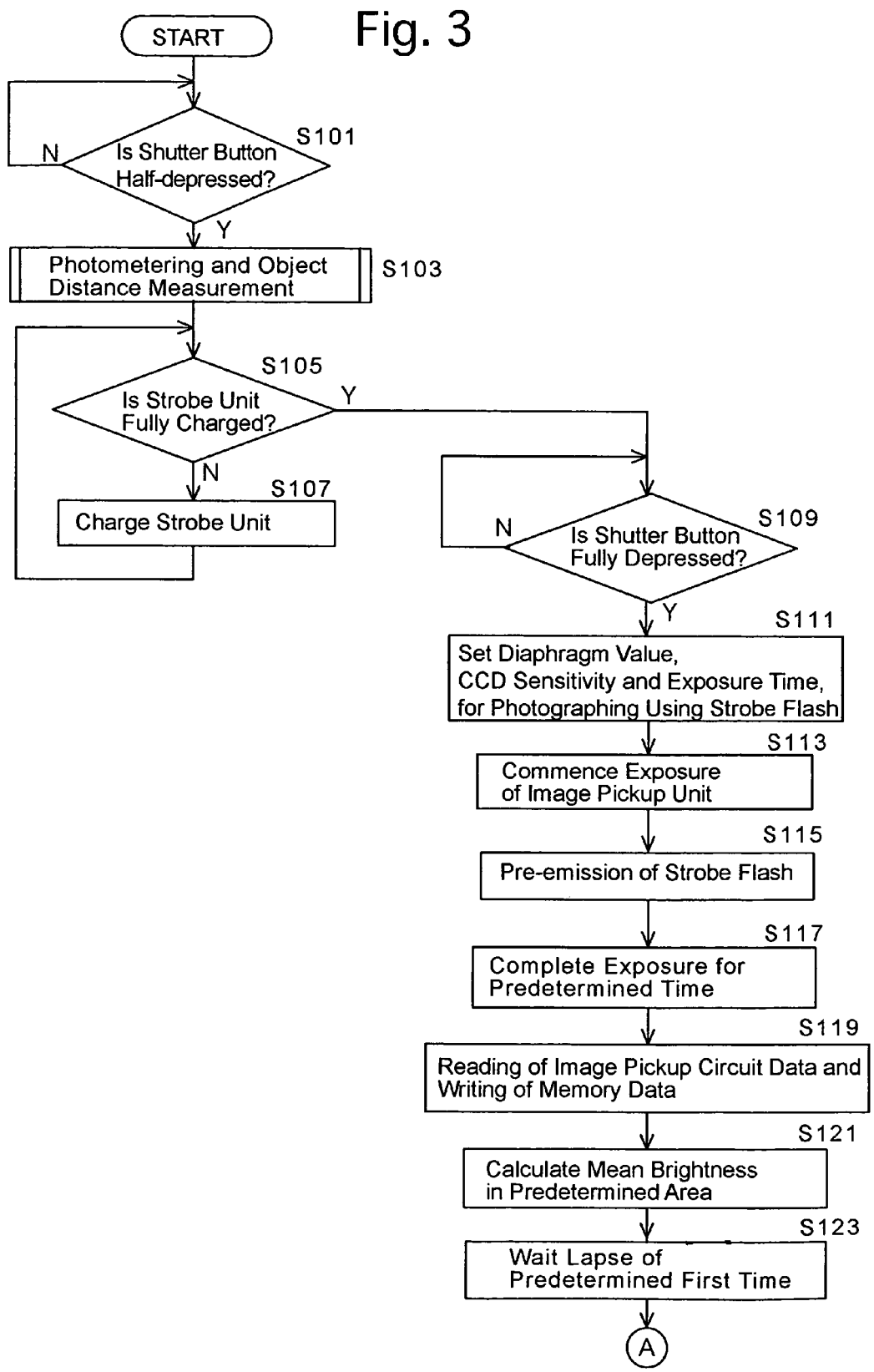
FIG. 3 is a flow chart of a primary stage of a red-eye reduction bracket photographing operation in a digital camera shown in FIG. 1.

The red-eye reduction bracket photographing operation in an embodiment of the present invention will be discussed below with reference to a timing chart shown in FIG. 2 and flow charts shown in FIGS. 3 to 7. FIG. 3 shows a flow chart of the main operation of a digital camera which is carried out when the power supply source is turned ON and the red-eye reduction bracket photographing mode is selected. In the flow charts, each step is represented by "S".

In the flow chart shown in FIG. 3, whether or not the shutter button 33 is half-depressed is checked (S101). Control does not proceed until the shutter button 33 is half-depressed (S101, N; S101). If the shutter button 33 is half-depressed, the object photometering operation and the object distance measuring operation are carried out (S101, Y; S103). In the photometering operation, the image data is input from the image pickup unit 15 to measure the brightness of an object-to-be-photographed in order to set the CCD sensitivity, the diaphragm value and the exposure time, in accordance with the program diagram to thereby make the object level optimum (for display in the LCD unit). In the object distance measuring operation, the image data is input from the image pickup unit 15 while moving the focusing lens group stepwise from the infinity focal position to the closest focal position, to obtain a sum or average of the absolute values of differences of the brightness between the adjacent pixels. The position in which the brightness difference is largest is set to be the focal position to which the focusing lens group is moved.

Thereafter, it is checked whether or not the strobe unit 31 is fully charged (S105). If the strobe unit 31 is not fully charged, the strobe charging operation is performed (S105, N; S107). If the strobe unit 31 is fully charged (S105, Y), it is checked whether or not the shutter button 33 is depressed by full step (S109). Control waits until a full-depression of the shutter button occurs (S109, N; S109). If the shutter button 33 is fully depressed, the image pickup operation begins at S111 (S109, Y; S111).

The diaphragm value, the CCD sensitivity, and the exposure time are set for the strobe-photographing operation (S111). The image pickup unit 15 carries out the exposure operation (S113), and the strobe unit carries out the pre-emission (S115). The pre-emission is performed for a very short space of time (10 μs to 30 μs).

When the predetermined exposure time (1/60 sec.) has lapsed, the exposure operation of the image pickup unit 15 is completed (S117). The image data picked up by the image pickup unit 15 in the exposure operation under the strobe pre-emission is read and is written in the cache memory 19 (S119). Thereafter, the image data of a predetermined area is read to calculate a mean brightness (S121). Control does not proceed until the first time (predetermined interval) from the commencement of the pre-emission lapses (S123).

Figure 4:
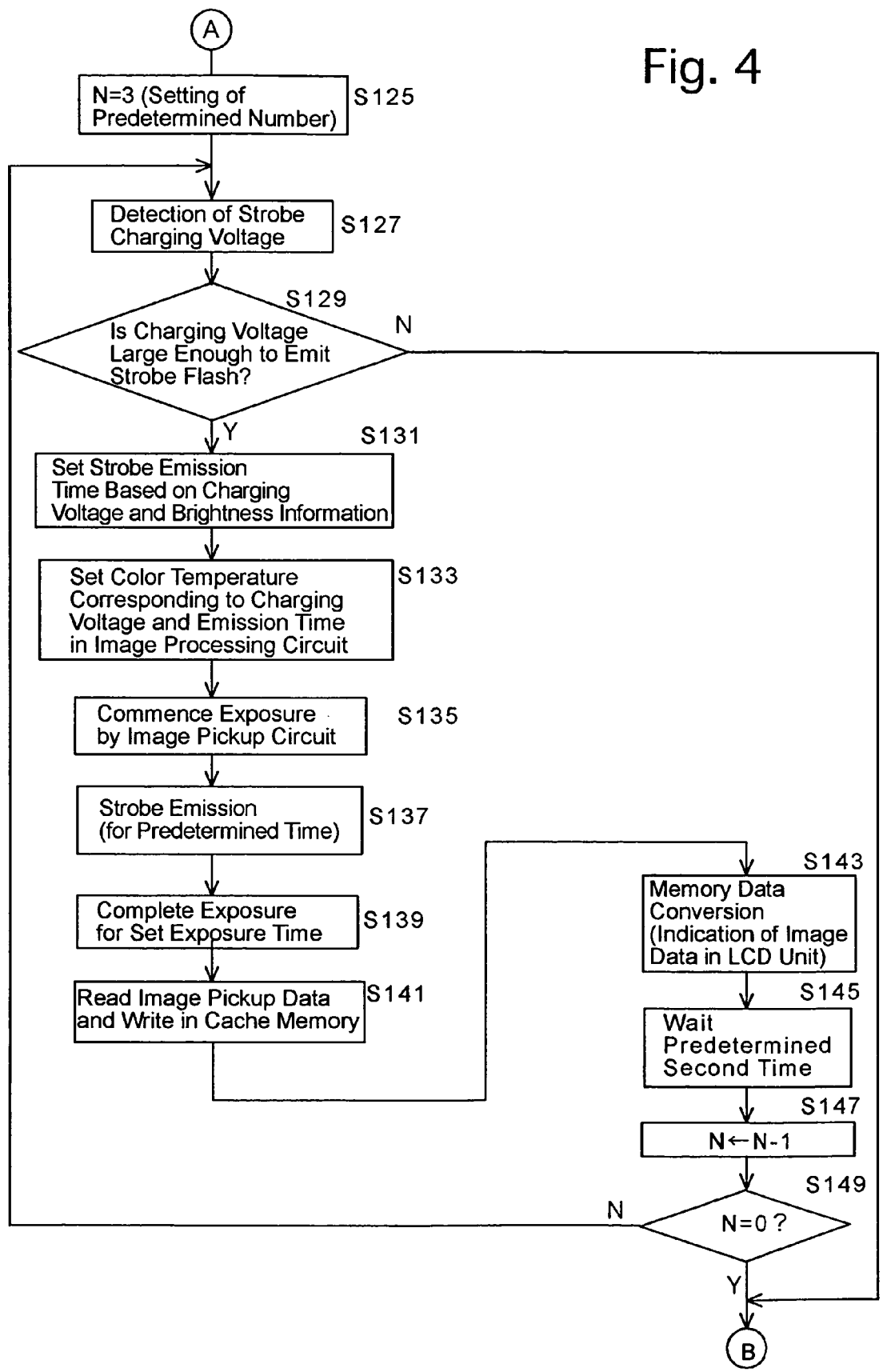
FIG. 4 is a flow chart of an intermediate stage of a red-eye reduction bracket photographing operation in a digital camera shown in FIG. 1.
Figure 5:
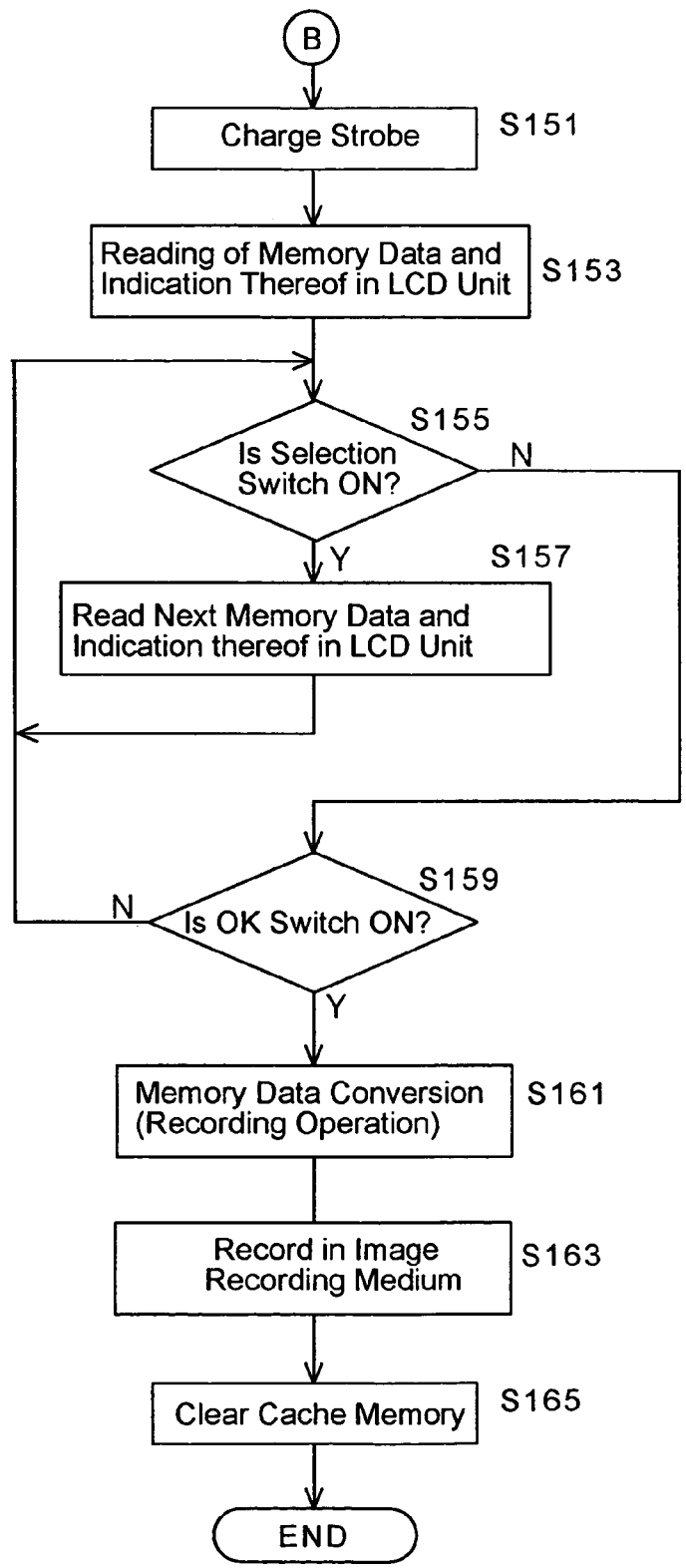
FIG. 5 is a flow chart of a last stage of a red-eye reduction bracket photographing operation in a digital camera shown in FIG. 1.

After the lapse of the first time (predetermined interval), the variable N which is used to set the number of the bracket photographing operations is set to 3 (S125) (see FIG. 4).

The strobe charging voltage is detected (S127), and it is checked whether the charging voltage is large enough to carry out a strobe emission (S129). If the charging voltage value is large enough to carry out the strobe emission, control proceeds to S131 to perform the red-eye reduction bracket photographing operation (S129, Y; S131). If the charging voltage is not large enough to emit a strobe flash, control skips the red-eye reduction bracket photographing operation (S129, N; S151).

If the charging voltage is large enough to emit strobe flash emission (S129, Y), the red-eye reduction bracket photographing operation is carried out as follows (S131 through S149). The strobe main emission time is determined based on the charging voltage and the object brightness information detected at S103 and S121 (S131). The color temperature is set in the image processing circuit 17, in accordance with the charging voltage and the emission time (S133). For the same amount of light of emission, the color temperature of the strobe light is increased as the charging voltage is increased and, accordingly, the emission time is reduced. Conversely, the color temperature of the strobe light is reduced as the charging voltage is decreased and, accordingly, the emission time is increased. The color temperature is controlled in accordance with these properties.

The image pickup unit starts the exposure operation (S135), and the strobe unit 31 performs the main emission of strobe light (S137). After the lapse of the appropriate exposure time set at S103, the exposure operation of the image pickup unit 15 ends (S139).

The image data is read from the image pickup unit 15 and is written in the cache memory 19 (S141). Thereafter, the data conversion operation is carried out to indicate the image data in the image displaying LCD unit 21 (S143). In this state, control waits for the lapse of a predetermined second time from the commencement of the strobe main emission at S137 (S145).

After the lapse of the predetermined second time, the variable N is decreased by one, and whether or not the variable is zero is checked (S147; S149). If the variable N is not zero, control is returned to S127 to repeat the operations of S127 through S147. Namely, the operations of S127 through S147 are repeated twice at an interval of the second time after the first operations of S127 through S147.

If the variable N is zero, control proceeds to S151 from the loop operation of S127 through S149 (S149, Y; S151). Namely, after the three image pickup operations under the strobe main emission are carried out to pick up three images, the loop operation ends.

With the result of the bracket photographing operations mentioned above, the three sets of image data are written in the cache memory 19 in the three image pickup operations under the main emissions following the pre-emission.

If the strobe charging voltage becomes smaller than the value large enough to emit the strobe light before the three pictures are photographed, the bracket photographing operation is stopped (S129, N; S151). In this case, it is desirable that the stopping of the bracket photographing operation be displayed in the image displaying LCD unit 21 to warn a user. At S151, the strobe unit 31 is charged.

In the operations of S153 through S165, a user visually confirms and selects the images taken by the red-eye reduction bracket photographing operation, in the image displaying LCD unit 21.

The first image data is read from the cache memory 19, the color temperature is corrected (the RGB level is adjusted) by the image processing circuit 17, and the first image data is indicated in the image displaying LCD unit 21 (S153). In this state, it is checked whether or not the selection switch 39 is turned ON (S155). If the selection switch 39 is not turned ON, it is checked whether or not the OK switch 37 is turned ON (S155, N; S159). If the OK switch 37 is not ON, control is returned to S155 (S159, N; S155). Namely, the indication in the image displaying LCD unit 21 is maintained until the selection switch 39 or the OK switch 37 is turned ON.

If the selection switch is turned ON, the next image data is read from the cache memory 19 and is indicated in the mage displaying LCD unit 21 (S155, Y; S157). In this embodiment, the image data written in the cache memory 19 is successively read in a loop while the selection switch 39 is ON. Note that it is possible to switch the displayed images each time the selection switch 39 is changed from OFF to ON.

When the OK switch 37 is turned ON (S159, Y), the image data-displayed in the image displaying LCD unit 21 undergoes a color temperature adjustment (the RGB level is adjusted) and is converted to a predetermined imaging format by the image processing circuit 17 (S161), is recorded in the image recording medium 27 (S163) via the image record/play circuit 25, and the cache memory 19 is cleared (S165). Thereafter, control ends (END). It is possible to return control to S101 without ending the sub-routine.

In the embodiment of the invention mentioned above, since a photograph is taken by performing a plurality of strobe main emissions at different lapse times, after the red-eye reduction pre-emission, a photographing operation can be carried out in different pupil states regardless of the photographing environmental conditions and differences in pupil among individuals, there is a high probability that at least one of the images produced is a desired image. Moreover, the user can visually confirm the images taken in the red-eye reduction bracket photographing operation in the image displaying LCD unit 21, and can record only the image that he or she wants to record. Thus, no unnecessary image data is recorded.

In this embodiment, only one set of image data can be selected, but it is possible to select no image or select a desired number of sets of image data.

Figure 6:
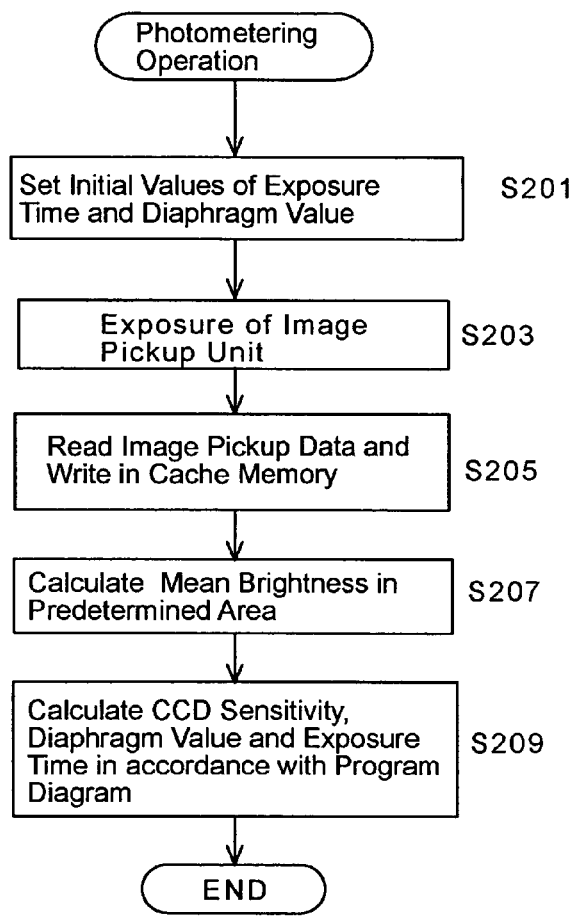
FIG. 6 is a flow chart of a photometering operation in a red-eye reduction bracket photographing operation in a digital camera shown in FIG. 1.
Figure 7:
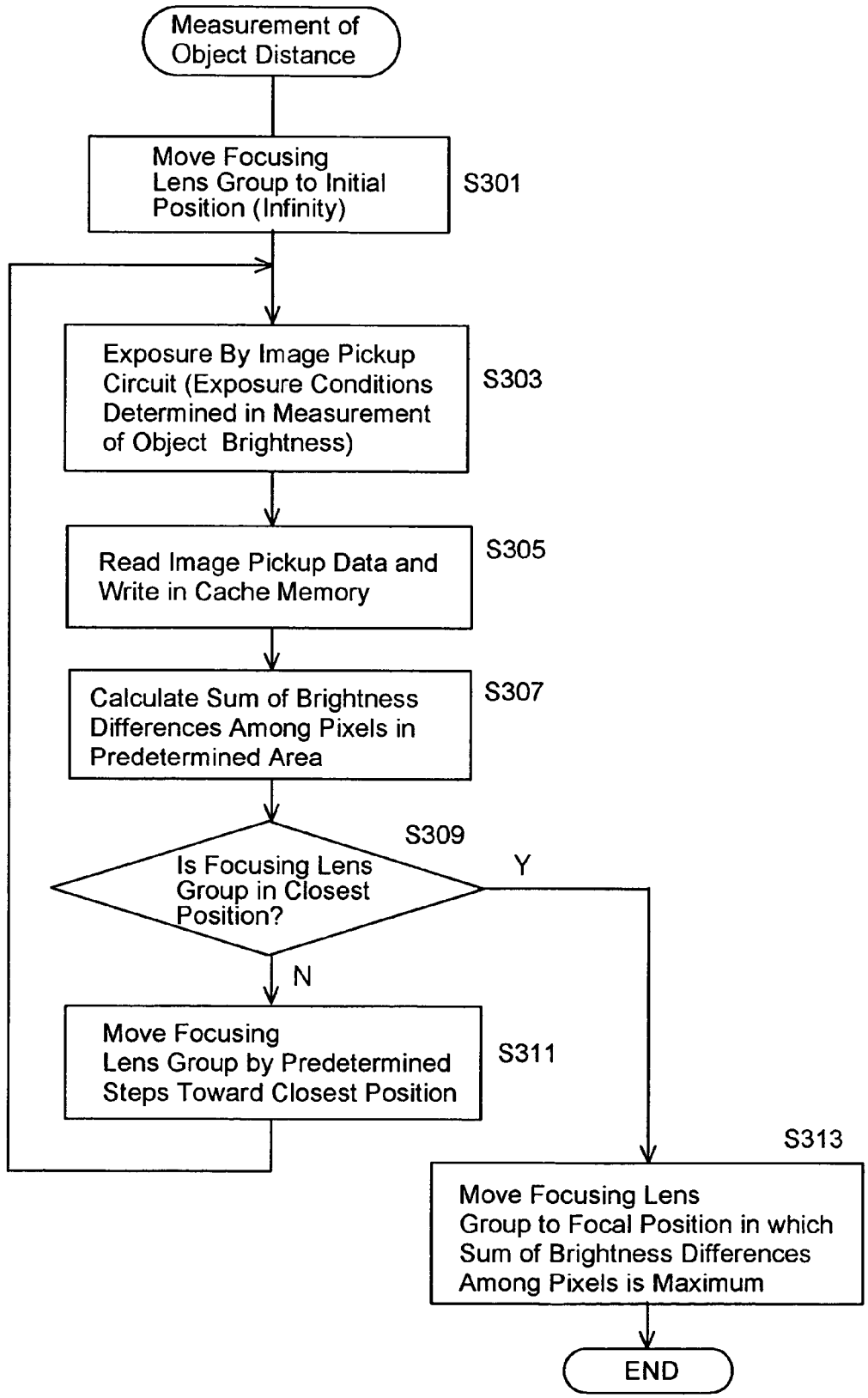
FIG. 7 is a flow chart of an object distance measuring operation in a red-eye reduction bracket photographing operation in a digital camera shown in FIG. 1.

The object brightness and distance measuring operations at S103 will be discussed below with reference to flowcharts shown in FIGS. 6 and 7. In this embodiment, the object distance measuring operation is carried out after the photometering operation is carried out.

In the photometering operation, the initial values of the exposure time and the diaphragm value of the image pickup unit 15 are set (S201). Thereafter, the exposure operation, i.e., the image pickup operation, is carried out for the exposure time (S203). Upon completion of the exposure operation, the image data is read from the image pickup unit 15 and is written in the cache memory 19 (S205). An average value of the brightness is calculated, using the image data of a predetermined area, included in image data written in the cache memory 19 (S207). Furthermore, the CCD sensitivity, the diaphragm value, and the exposure time are set based on the brightness information thus obtained, in accordance with the program diagram (S209, END). The set values are used in the object distance measuring operation which will be discussed below.

When the photometering operation is completed, the object distance measuring operation is carried out. In the object distance measuring operation, the focusing lens group is moved to the initial position by the lens unit drive circuit 29 (S301). In this embodiment, the focusing lens group is moved to the infinity focal position.

Thereafter, the image pickup unit 15 performs the exposure operation at the exposure conditions set at step S209 (S303). When the exposure operation is completed, the image data is read from the image pickup unit 15 and is written in the cache memory 19 (S305).

A sum of absolute values of brightness differences between the pixels is calculated, using the image data of a predetermined area, included in the image data recorded in the cache memory 19 (S307). The sum or an average of the brightness differences is written in the RAM 23a together with the position information of the focusing lens group at that time.

Subsequently, it is checked whether or not the focusing lens group is in the closest position (S309). If the focusing lens group is not in the closest position, the focusing lens group is moved to the closest position by a predetermined number of steps and control is returned to S303. The operations of S303 to S309 mentioned above are repeated. Thus, the sum of the brightness differences in absolute value is obtained while moving the focusing lens group from the infinity focal position to the closest position by a predetermined number of steps.

When the absolute value of the sum of the brightness differences until the infinity focal position is obtained, control proceeds from S309 to S313 (S309, Y; S313). At S313, the maximum value of the sum of the brightness differences is obtained. The focusing lens group is moved to the position corresponding to the maximum value. When the movement of the focusing lens group is completed, control is returned (RETURN).

The focusing operation ends when the above-mentioned object distance measuring operation is completed. The distance of the focused object can be determined based on the displacement of the focal position of the focusing lens group to the focal position.

FIG. 8 shows generally the operation to call the mode/parameter by the menu switch and to select the mode/parameter by the selection switch 39. In this embodiment, "interval after red-eye reduction pre-emission", "red-eye reduction pre-emission time", "bracket photographing number", and "bracket photographing operation interval" are selected by the operation of the menu switch. The "interval after red-eye reduction pre-emission" refers to the time from the pre-emission to the first main emission and exposure (a predetermined first time). The "red-eye reduction pre-emission time" refers to the time in which the pre-emission is maintained for reducing the re-dye phenomenon. The "bracket photographing number" refers to the number of the red-eye reduction bracket photographing operations. The "bracket photographing operation interval" refers to the interval of the bracket photographing operations (predetermined second time). In this embodiment, the system control circuit 23, the selection switch 39 and the OK switch 37 constitute image selection device, interval setting device, pre-emission time setting device, bracket photographing number setting device, and bracket photographing interval setting device.

In this embodiment, when the menu switch 41 is turned ON, a symbol or the words "Interval After Red-eye reduction Pre-emission" and the time are indicated in the image displaying LCD unit 21. In this state, each time the selection switch 39 is depressed, the time is changed in the looped sequence "600", "700", "800" and "600", etc. The unit of time is ms.

When the menu switch 41 is depressed, the time indicated at that moment is set as the "interval after red-eye reduction pre-emission" and the indications in the image displaying LCD unit 21 are changed to a symbol or letters of "red-eye reduction pre-emission time" and the corresponding time. In this state, if the selection switch 39 is depressed, the time is changed in the looped sequence "10", "20", "30" and "10", etc., by each depression of the selection switch 39. The unit of time is μs.

When the menu switch 41 is turned ON, the time indicated at that moment is set to "red-eye reduction pre-emission time", and the indications of the image displaying LCD unit 21 are changed to "bracket photographing number" and the value of the number. The bracket photographing number can be a desired number and is not limited to three time. In this state, when the selection switch 39 is depressed, the number is changed to "2", "3", "4", and "2", etc., in a looped sequence by each depression of the selection switch 39.

When the menu switch 41 is turned ON, the number indicated at that moment is set to be "bracket photographing number" and the indications of the image displaying LCD unit 21 are changed to "bracket photographing operation interval" and the time. In this state, when the selection switch 39 is depressed, the time is changed to "100", "150, "200" and "100", etc., in a looped sequence by each depression of the selection switch 39. The unit of time is ms.

When the menu switch 41 is turned ON, the time indicated at that moment is set to be "bracket photographing operation interval" and the indication of the image displaying LCD unit 21 is changed to "Exit". In this state, when the OK switch 37 is depressed, the indication of "Exit" disappears and the selection mode ends.

If the menu switch 41 is turned ON when "Exit" is indicated, the mode is switched to "interval after red-eye reduction pre-emission" setting mode and the indication of "Exits" disappears.

The predetermined interval, the red-eye reduction pre-emission time, the bracket photographing number, and the bracket photographing operation interval, set in the operations mentioned above are written in EEPROM 23b and can be read and used in the photographing operation in the red-eye reduction bracket photographing mode.

Note that the shortest time of the predetermined interval (predetermined first time) and the bracket photographing operation interval (predetermined second time) is represented by a time between the commencement of the exposure by the image pickup unit 15 and the completion of storage of the image data output from the image pickup unit 15 and processed by the image processing circuit 17 into the cache memory 19. The predetermined interval and the bracket photographing operation interval, which can be set, are predetermined so that they are longer than the shortest time.

It is possible to automatically set the pre-emission time or the predetermined interval (predetermined first time) or to shift the set value thereof is so that the pre-emission time or the predetermined interval is increased as the brightness of the object is increased and the object distance is increased, and conversely the pre-emission time or the predetermined interval is decreased as the brightness of the object is reduced and the object distance is decreased.

Alternatively, the bracket photographing operation interval (predetermined second time) can be independently set each time.

Although the above discussion has been directed to a digital camera having a built-in strobe unit, the present invention can be applied to a camera to which a strobe unit can be attached. The image recording medium is, for example, a nonvolatile storage, such as an IC card, or a hard disc drive, and can be non-detachable. Furthermore, the exposure completion operation of the image pickup unit may be carried out by a mechanical shutter.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital camera having a red-eye reduction bracket photographing mode, comprising:
    an image pickup device;
    a strobe unit which can pre-emit a flash emission of light;
    an image pickup control device having a bracket photographing mode in which a plurality of image pickup operations to pickup an image by emitting main strobe light from the strobe unit are repeated after the lapse of a predetermined first time counted from a pre-emission of the strobe unit;
    an interval setting device by which a user can set a first period of time from the pre-emission to a first main emission of the strobe unit;
    a bracket photographing interval setting device by which a user can set intervals of bracket photographing operations to pickup an image by the main emission of the strobe unit;
    a temporary storage device in which image data obtained by the plurality of image pickup operations of the image pickup device is temporarily written;
    an image display device for reading and displaying the image data written in the temporary storage device;
    an image selection device by which a user can select the image data displayed in the image display device; and
    a recording device for writing the image data selected by the image selection device in a recording medium.

2. The digital camera having a red-eye reduction bracket photographing mode according to claim 1, wherein said image selection device is capable of selecting at least one of the image data written in the temporary storage device and not selecting any of the image data written in the temporary storage device.

3. The digital camera having a red-eye reduction bracket photographing mode according to claim 2, further comprising a data erasing device for removing the image data not selected by the image selection device from the temporary storage device.

4. The digital camera having a red-eye reduction bracket photographing mode according to claim 1, further comprising bracket photographing number setting device by which a user can set the number of the bracket photographing operations in which the strobe unit is activated to emit main strobe light to thereby pickup an image.

5. The digital camera having a red-eye reduction bracket photographing mode according to claim 1, wherein said strobe unit comprises a charging voltage detection device for detecting a charging voltage, and wherein said image pickup control device terminates the bracket photographing even before the number of the bracket photographing operations reaches a set value in the case where the strobe charging voltage detected by the detection device prior to each strobe emission is too small to emit the strobe light from the strobe unit.

6. The digital camera having a red-eye reduction bracket photographing mode according to claim 5, wherein said image pickup control device causes the display device to indicate alarm information in the case where the bracket photographing ends before the number of the bracket photographing operations reaches the set value.

7. The digital camera having a red-eye reduction bracket photographing mode according to claim 1, wherein said bracket photographing interval setting device independently sets intervals of the main emission of the strobe unit to pickup an image.

8. The digital camera having a red-eye reduction bracket photographing mode according to claim 1, further comprising a memory for storing the intervals of the bracket photographing operations set by the bracket photographing interval setting device, wherein the intervals of the bracket photographing operations include a minimum value which is represented by the longest of a time in which the writing of the exposure time and the image data output from the image pickup device into the temporary storage device is completed and a time in which a subsequent main emission of the strobe unit can be effected.

9. The digital camera having a red-eye reduction bracket photographing mode according to claim 1, further comprising a pre-emission time setting device by which a user can set a pre-emission time.

10. The digital camera having a red-eye reduction bracket photographing mode according to claim 1, further comprising an object photometering device and an object distance measuring device, wherein said image pickup control device sets one of the pre-emission time and the first time, based on brightness information obtained by the photometering device and object distance information obtained by the object distance measuring device.

11. The digital camera having a red-eye reduction bracket photographing mode according to claim 1, further comprising a charging voltage detection device for detecting a charging voltage of the strobe unit and an image processing device for adjusting a color temperature in connection with the image data, based on the charging voltage when the strobe unit emits the strobe light, detected by the charging voltage detection device.

* * * * *